(12) United States Patent
Park

(10) Patent No.: US 12,534,814 B2
(45) Date of Patent: Jan. 27, 2026

(54) WATER ELECTROLYSIS SEPARATOR AND ELECTROCHEMICAL DEVICE

(71) Applicants: HYUNDAI MOTOR COMPANY, Seoul (KR); KIA CORPORATION, Seoul (KR)

(72) Inventor: Joon Guen Park, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 719 days.

(21) Appl. No.: 17/942,654

(22) Filed: Sep. 12, 2022

(65) Prior Publication Data

US 2023/0416926 A1    Dec. 28, 2023

(30) Foreign Application Priority Data

Jun. 24, 2022  (KR) .................. 10-2022-0077853

(51) Int. Cl.
| | |
|---|---|
| C25B 1/04 | (2021.01) |
| C25B 9/19 | (2021.01) |
| C25B 9/63 | (2021.01) |
| C25B 11/02 | (2021.01) |

(52) U.S. Cl.
CPC .................. C25B 1/04 (2013.01); C25B 9/19 (2021.01); C25B 9/63 (2021.01); C25B 11/02 (2013.01)

(58) Field of Classification Search
None
See application file for complete search history.

(56) References Cited

U.S. PATENT DOCUMENTS

| | | | | |
|---|---|---|---|---|
| 6,080,290 A | * | 6/2000 | Stuart | H01M 8/2483 204/255 |
| 6,309,521 B1 | * | 10/2001 | Andrews | C25B 1/13 204/263 |
| 6,355,371 B1 | * | 3/2002 | Farkash | H01M 8/0297 429/508 |
| 9,567,679 B2 | * | 2/2017 | Domit | C25B 9/73 |

(Continued)

FOREIGN PATENT DOCUMENTS

| | | |
|---|---|---|
| JP | 2011150851 A | 8/2011 |
| JP | 6268362 B2 | 1/2018 |

(Continued)

*Primary Examiner* — Harry D Wilkins, III
(74) *Attorney, Agent, or Firm* — Lempia Summerfield Katz LLC

(57) ABSTRACT

A water electrolysis separator includes a first plate member having a reaction part configured to define a reaction region in which a reaction is produce by a membrane electrode assembly (MEA). The first plate member has first manifold flow paths spaced apart from the reaction part and first channel patterns extending from edges of the first manifold flow paths and defining first connection channels configured to connect the reaction part and the first manifold flow paths. The separator includes a second plate member stacked on the first plate member, configured to cover the first connection channels, and including a through portion corresponding to the reaction part and second manifold flow paths corresponding to the first manifold flow paths. The separator includes a sealing member configured to seal a portion between the first plate member and the second plate member.

18 Claims, 9 Drawing Sheets

(56) References Cited

U.S. PATENT DOCUMENTS

| | | | | |
|---|---|---|---|---|
| 10,141,585 B2* | 11/2018 | Beverage | ................ | C25B 13/04 |
| 11,655,551 B2* | 5/2023 | Rouveyre | ................ | C25B 9/75 |
| | | | | 205/344 |
| 2002/0122970 A1* | 9/2002 | Inoue | ................ | H01M 8/0273 |
| | | | | 264/328.8 |
| 2005/0115825 A1* | 6/2005 | Frank | ................ | H01M 8/0263 |
| | | | | 204/253 |
| 2014/0238845 A1* | 8/2014 | Domit | ................ | C25B 1/04 |
| | | | | 204/228.4 |
| 2014/0242476 A1* | 8/2014 | Kuhne | ................ | H01M 8/04029 |
| | | | | 429/434 |
| 2015/0233000 A1* | 8/2015 | Roemer | ................ | C25B 9/65 |
| | | | | 204/279 |
| 2015/0349353 A1* | 12/2015 | Hood | ................ | H01M 8/0263 |
| | | | | 429/514 |
| 2022/0018030 A1* | 1/2022 | Stuart | ................ | C25B 1/34 |

FOREIGN PATENT DOCUMENTS

| | | |
|---|---|---|
| KR | 100866758 B1 | 11/2008 |
| KR | 102008250 B1 | 8/2019 |
| KR | 20200068122 A | 6/2020 |
| WO | 2011013869 A1 | 2/2011 |

\* cited by examiner

WATER ELECTROLYSIS SEPARATOR AND ELECTROCHEMICAL DEVICE

CROSS-REFERENCE TO RELATED APPLICATION

This application claims priority to and the benefit of Korean Patent Application No. 10-2022-0077853 filed in the Korean Intellectual Property Office on Jun. 24, 2022, the entire contents of which are incorporated herein by reference.

TECHNICAL FIELD

The present disclosure relates to a water electrolysis separator and an electrochemical device, and more particularly, to a water electrolysis separator and an electrochemical device, which are capable of improving safety and reliability, and simplifying a structure of the electrochemical device and a manufacturing process for a sealing member.

BACKGROUND ART

There is a consistently increasing need for research and development on alternative energy to cope with global warming and depletion of fossil fuels. Hydrogen energy is attracting attention as a practical solution for solving environment and energy issues.

In particular, because hydrogen has high energy density and properties suitable for application in a grid-scale, hydrogen is in the limelight as a future energy carrier.

A water electrolysis stack, which is an electrochemical device, refers to a device that produces hydrogen and oxygen by electrochemically decomposing water. The water electrolysis stack may be configured by stacking several tens or several hundreds of water electrolysis cells (unit cells) in series.

The water electrolysis cell may include a membrane electrode assembly (MEA) and separators (an anode separator and a cathode separator) respectively stacked on two opposite surfaces of the membrane electrode assembly.

SUMMARY

The present disclosure has been made in an effort to provide a water electrolysis separator and an electrochemical device, which are capable of improving safety and reliability, and simplifying a structure of the electrochemical device and a manufacturing process for a sealing member.

In particular, the present disclosure has been made in an effort to simplify a structure and a manufacturing process while ensuring a stable flow (flow efficiency) of a target fluid in a connection channel that guides the target fluid, which is introduced through a manifold flow path of a separator, to a reaction part.

Among other things, the present disclosure has been made in an effort to simplify a process of manufacturing a sealing member while preventing a connection channel from being clogged.

The present disclosure has also been made in an effort to implement both a cathode separator and an anode separator by using a single type of separator having the same structure.

The present disclosure has also been made in an effort to improve productivity and production efficiency and reduce manufacturing costs.

The objects to be achieved by the embodiments are not limited to the above-mentioned objects, but also include objects or effects that may be understood from the solutions or embodiments described below.

An embodiment of the present disclosure provides a water electrolysis separator including a first plate member having a reaction part configured to define a reaction region in which a reaction is produced by a membrane electrode assembly (MEA). The first plate member also has first manifold flow paths spaced apart from the reaction part and first channel patterns extending from edges of the first manifold flow paths and configured to define first connection channels configured to connect the reaction part and the first manifold flow paths so that the reaction part and the first manifold flow paths communicate with one another. The water electrolysis separator also has a second plate member stacked on the first plate member so as to cover the first connection channels. The second plate member includes a through portion corresponding to the reaction part and second manifold flow paths corresponding to the first manifold flow paths. The water electrolysis separator also has a sealing member configured to seal a portion between the first plate member and the second plate member.

According to an embodiment of the present disclosure, the first channel pattern may include a first protrusion pattern configured to define the first connection channel between the reaction part and the first manifold flow path and may include a first connection pattern configured to connect the first plate member and the first protrusion pattern while traversing the first manifold flow path.

According to an embodiment of the present disclosure, the first channel pattern may be integrated with the first plate member by partially processing a part of the first plate member.

According to an embodiment of the present disclosure, the sealing member may include an edge sealing part provided along an edge of the first plate member and channel sealing parts provided along the first channel patterns and connected to the edge sealing part.

According to an embodiment of the present disclosure, the channel sealing parts may be provided to define a unitary one-piece structure together with the edge sealing part.

According to an embodiment of the present disclosure, the first manifold flow paths may be respectively provided at one end (e.g., a first end) and the other end (e.g., a second end) of the first plate member with the reaction part interposed therebetween. The first manifold flow paths may be symmetric with respect to a horizontal reference line that passes through a center of the first plate member.

According to an embodiment of the present disclosure, a reaction surface of the reaction part may be formed to be flat.

According to an embodiment of the present disclosure, the water electrolysis separator may include a reaction pattern provided on a reaction surface of the reaction part.

According to an embodiment of the present disclosure, the second plate member may include second channel patterns extending from edges of the second manifold flow paths and configured to define second connection channels configured to connect the reaction part and the second manifold flow paths so that the reaction part and the second manifold flow paths communicate with one another. The second connection channels may communicate with the first connection channels.

According to an embodiment of the present disclosure, the second channel pattern may include a second protrusion pattern configured to define the second connection channel between the reaction part and the second manifold flow path and may include a second connection pattern configured to connect the second plate member and the second protrusion pattern while traversing the second manifold flow path.

According to an embodiment of the present disclosure, the second channel pattern may be integrated with the second plate member by partially processing a part of the second plate member.

Another embodiment of the present disclosure provides an electrochemical device including: a membrane electrode assembly (MEA); mass transfer layers respectively stacked on two opposite surfaces of the membrane electrode assembly; and separators respectively stacked on the mass transfer layers. Each separator includes a first plate member having a reaction part configured to define a reaction region in which a reaction is produced by the membrane electrode assembly (MEA). The first plate member also has first manifold flow paths spaced apart from the reaction part and first channel patterns extending from edges of the first manifold flow paths and configured to define first connection channels configured to connect the reaction part and the first manifold flow paths so that the reaction part and the first manifold flow paths communicate with one another. Each separator also includes a second plate member stacked on the first plate member and having a through portion corresponding to the reaction part and second manifold flow paths corresponding to the first manifold flow paths. Each separator also has a sealing member configured to seal a portion between the first plate member and the second plate member.

According to an embodiment of the present disclosure, the sealing member may include an edge sealing part provided along an edge of the first plate member and channel sealing parts provided along the first channel patterns and connected to the edge sealing part. In particular, the channel sealing parts may be provided to define a unitary one-piece structure together with the edge sealing part.

According to an embodiment of the present disclosure, the first channel pattern may include a first protrusion pattern configured to define the first connection channel between the reaction part and the first manifold flow path and may include a first connection pattern configured to connect the first plate member and the first protrusion pattern while traversing the first manifold flow path.

According to an embodiment of the present disclosure, a reaction surface of the reaction part may be formed to be flat and the mass transfer layer may pass through the through portion and be in close contact with the reaction surface.

According to an embodiment of the present disclosure, the electrochemical device may include a reaction channel provided on a reaction surface of the reaction part and the mass transfer layer may pass through the through portion and be in close contact with the reaction channel.

According to an embodiment of the present disclosure, the second plate member may include second channel patterns extending from edges of the second manifold flow paths and configured to define second connection channels configured to connect the reaction part and the second manifold flow paths so that the reaction part and the second manifold flow paths communicate with one another. The second connection channels may communicate with the first connection channels.

According to an embodiment of the present disclosure, the second channel pattern may include a second protrusion pattern configured to define the second connection channel between the reaction part and the second manifold flow path and may include a second connection pattern configured to connect the second plate member and the second protrusion pattern while traversing the second manifold flow path.

According to an embodiment of the present disclosure, the electrochemical device may include a gasket member provided on one surface of the separator facing the membrane electrode assembly. The gasket member may be configured to seal a portion between the membrane electrode assembly and the separator. The electromechanical device may also include a unit cell gasket member provided on the other surface of the separator and a conductive member provided on the other surface of the separator.

DETAILED DESCRIPTION

Figure 1:
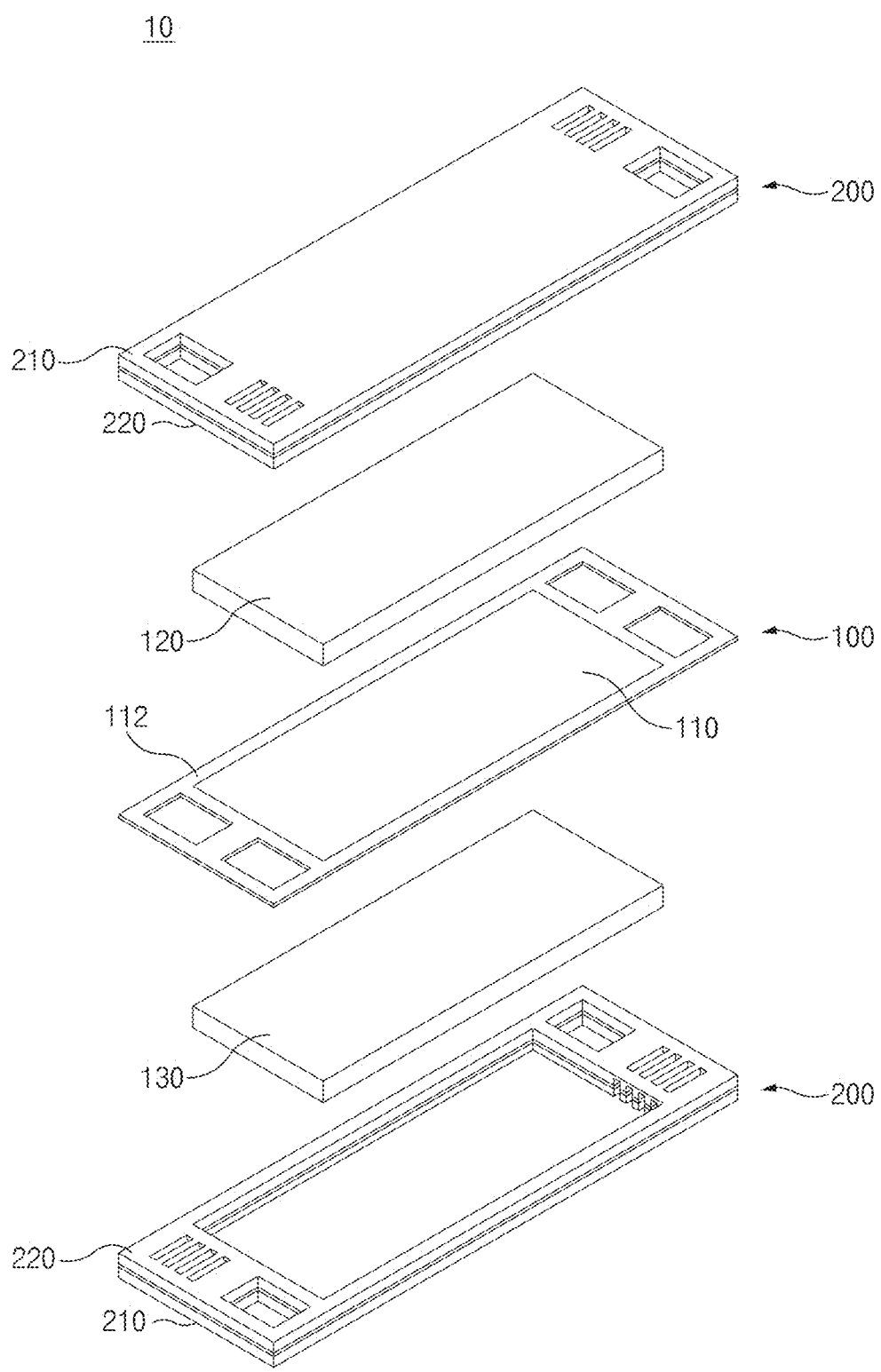
FIG. 1 is a view of an electrochemical device according to an embodiment of the present disclosure.

Hereinafter, embodiments of the present disclosure are described in detail with reference to the accompanying drawings.

However, the technical spirit of the present disclosure is not limited to the embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure should be construed as having the meaning commonly understood by a person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element. The nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element. When a component, device, element, or the like of the present disclosure is described as having a purpose or performing an operation, function, or the like, the component, device, or element should be considered herein as being "configured to" meet that purpose or perform that operation or function.

Referring to FIGS. 1-9, an electrochemical device 10 according to an embodiment of the present disclosure includes: a membrane electrode assembly (MEA) 110; mass transfer layers 120 and 130 respectively stacked on two opposite surfaces of the membrane electrode assembly 110; and separators 200 respectively stacked on the mass transfer layers 120 and 130. The separator 200 includes a first plate member 210, a second plate member 220, and a sealing member 230. The first plate member 210 includes a reaction part 212 configured to define a reaction region in which a reaction is made or produced by the membrane electrode assembly 110. The first plate member 210 also includes first manifold flow paths 214 spaced apart from the reaction part 212 and first channel patterns 216 extending from edges of the first manifold flow paths 214 and configured to define first connection channels 216a configured to connect the reaction part 212 and the first manifold flow paths 214 so that the reaction part 212 and the first manifold flow paths 214 communicate with one another. The second plate member 220 is stacked on the first plate member 210 and includes a through portion 222 corresponding to the reaction part 212 and second manifold flow paths 224 corresponding to the first manifold flow paths 214. The sealing member 230 seals a portion between the first plate member 210 and the second plate member 220.

This is to improve safety and reliability of the electrochemical device and simplify a structure of the electrochemical device and a process of manufacturing the electrochemical device.

In other words, to ensure performance, safety, and reliability of a water electrolysis stack, it is necessary to ensure an area of a flow path for a target fluid flowing along a connection channel and ensure a stable flow of the target fluid.

However, in the related art, the connection channel is clogged by a gasket when the gasket provided to cover the connection channel swells. In this case, it is difficult to sufficiently ensure a flow path for the target fluid (a cross-sectional area of a flow path of the connection channel), which causes a problem in that flow efficiency of the target fluid deteriorates.

In addition, in the related art, there has been suggested a method of forming the connection channel in the form of a hole, instead of a groove (a groove having an opening portion), at a boundary between a reaction part and a manifold flow path to prevent the connection channel from being clogged by the gasket. However, a separator made of a high-strength material (e.g., titanium) needs to be pierced by a drill or the like to form the connection channel in the form of a hole at the boundary between the reaction part and the manifold flow path. For this reason, there are problems in that a manufacturing process is complicated and inconvenient, productivity and production efficiency deteriorate, and costs increase.

In contrast, in the embodiment of the present disclosure, the first connection channels each provided in the form of a hole (a hole closed in all directions) may be provided between the first and second plate members stacked on each other, such that the first connection channels may be spatially separated from a gasket member configured to seal the portion between the separator and a reaction layer (the membrane electrode assembly). Therefore, it is possible to obtain an advantageous effect of preventing the connection channel from being clogged by the swelled gasket member and an advantageous effect of ensuring a stable flow (flow efficiency) of the target fluid.

Among other things, in embodiments of the present disclosure, the first connection channels each provided in the form of a hole may be formed by stacking the first plate member and the second plate member without performing a separate drilling process. Therefore, it is possible to obtain an advantageous effect of simplifying a manufacturing process and improving productivity and production efficiency.

Moreover, in embodiments of the present disclosure, the first channel patterns extending from the edges of the first manifold flow paths may be provided, such that the sealing member may be continuously formed not only to the edge of the first plate member but also to the peripheries of the first channel flow paths. Therefore, it is possible to obtain an advantageous effect of reducing costs and simplifying a structure of the sealing member and a process of manufacturing the sealing member.

In other words, if the first channel pattern is spaced apart from the edge of the first plate member, sealing members need to be respectively provided at the edge of the first plate member and the peripheries of the first channel flow paths to seal the portion between the first plate member and the second plate member. For this reason, there is a problem in that the structure and the manufacturing process are troublesome and complicated.

In contrast, in embodiments of the present disclosure, the edge of the first plate member and the peripheries of the first channel flow paths may be connected by means of the first channel patterns, such that the sealing member may be manufactured by a single process (injection molding process) to seal the edge of the first plate member and the peripheries of the first channel flow paths. Therefore, it is possible to obtain an advantageous effect of reducing costs and simplifying a structure of the sealing member and a process of manufacturing the sealing member.

For reference, the electrochemical device 10 according to an embodiment of the present disclosure may be used to generate electrochemical reactions between various reaction fluids in accordance with required conditions and design specifications. The present disclosure is not restricted or limited by the type and property of the reaction fluid used for the electrochemical device 10.

For example, the electrochemical device 10 according to the embodiment of the present disclosure may be used as a water electrolysis stack that produces hydrogen and oxygen by decomposing water through an electrochemical reaction.

The water electrolysis stack (electrochemical device) may be configured by stacking a plurality of unit cells in a reference stacking direction (e.g., an upward/downward direction based on FIG. 1).

More specifically, the unit cell may include a reaction layer 100 and the separators 200 respectively stacked on the two opposite surfaces of the reaction layer 100. The water electrolysis stack may be configured by stacking the plurality of unit cells in the reference stacking direction and then assembling endplates (not illustrated) to two opposite ends of the plurality of unit cells.

The reaction layer 100 may have various structures capable of generating the electrochemical reaction of the reaction fluid (e.g., water). The present disclosure is not restricted or limited by the type and structure of the reaction layer 100.

For example, the reaction layer 100 may include the membrane electrode assembly (MEA) 110, and the mass transfer layers 120 and 130 stacked on the membrane electrode assembly 110.

The membrane electrode assembly 110 may be variously changed in structure and material in accordance with required conditions and design specifications. The present disclosure is not limited or restricted by the structure and material of the membrane electrode assembly 110.

For example, the membrane electrode assembly 110 may be configured by attaching catalyst electrode layers (e.g., an anode electrode layer and a cathode electrode layer), in which electrochemical reactions are generated, to two opposite surfaces of an electrolyte membrane.

For reference, in an embodiment of the present disclosure, the mass transfer layers 120 and 130 are defined as including both a gas diffusion layer 120 and a porous transport layer 130.

The gas diffusion layer 120 and the porous transport layer 130 may serve to uniformly distribute the reaction fluid and have a porous structure having pores with predetermined sizes.

For example, the gas diffusion layer 120 may be stacked on and in close contact with one surface (a top surface based on FIG. 1) of the membrane electrode assembly 110. The porous transport layer 130 may be stacked on and in close contact with the other surface (a bottom surface based on FIG. 1) of the membrane electrode assembly 110.

For reference, water supplied to the anode electrode layer, which is an oxidation electrode for the water electrolysis, is separated into hydrogen ions (protons), electrons, and oxygen. The hydrogen ions move to the cathode electrode layer, which is a reduction electrode, through the electrolyte membrane, and the electrons move to a cathode through an external circuit. In addition, the oxygen may be discharged through an anode outlet, and the hydrogen ions and the electrons may be converted into hydrogen at the cathode.

Referring to FIGS. 1-6, the separators 200, together with the reaction layer 100, may constitute a single unit cell (water electrolysis cell). The separators 200 may serve not only to block hydrogen and water separated by the reaction layer 100, but also to ensure flow paths (flow fields) through which hydrogen and water flow.

In addition, the separators 200 may also serve to distribute heat, which is generated from the unit cell, to the entire unit cell. The excess heat generated may be discharged to the outside by water (coolant) flowing along the separators 200.

For reference, in an embodiment of the present disclosure, the separators 200 are defined as including both the anode separator and the cathode separator that independently define the flow paths (channels) for water and air in the water electrolysis stack.

More specifically, the separator 200 includes the first plate member 210, the second plate member 220, and the sealing member 230. The first plate member 210 includes the reaction part 212 configured to define the reaction region in which the reaction is made or produced by the membrane electrode assembly (MEA) 110. the first plate member 210 also includes the first manifold flow paths 214 spaced apart from the reaction part 212 and the first channel patterns 216 extending from the edges of the first manifold flow paths 214. The first channel patterns 216 are configured to define the first connection channels 216a configured to connect the reaction part 212 and the first manifold flow paths 214 so that the reaction part 212 and the first manifold flow paths 214 communicate with one another. The second plate member 220 is stacked on the first plate member 210 to cover the first connection channels 216a. The second plate member 220 includes the through portion 222 corresponding to the reaction part 212 and the second manifold flow paths 224 corresponding to the first manifold flow paths 214. The sealing member 230 seals the portion between the first plate member 210 and the second plate member 220.

The first plate member 210 may have various structures including the reaction part 212, the first manifold flow paths 214, and the first channel patterns 216. The present disclosure is not restricted or limited by the structure of the first plate member 210.

For example, the first plate member 210 may have an approximately quadrangular plate shape. According to another embodiment of the present disclosure, the first plate member may have a circular shape or other shapes.

The reaction part 212 (e.g., the reaction part having an approximately quadrangular shape) may be provided at an approximately central portion of the first plate member 210 so as to face one surface of the membrane electrode assembly 110 and may define the reaction region. The first manifold flow paths 214 may be formed to penetrate two opposite ends of the first plate member 210, respectively, with the reaction part 212 interposed therebetween. The first manifold flow paths 214 may serve to allow hydrogen, air, and a coolant to flow (to be supplied and discharged).

According to an embodiment of the present disclosure, a reaction surface 212a of the reaction part 212 may be formed to be flat. The porous transport layer 130 may be in close contact with the reaction surface 212a (see FIG. 8) of the reaction part 212.

According to an embodiment of the present disclosure, the first plate member 210 may be made of thin-film metal (e.g., titanium, stainless, Inconel, or aluminum). According to another embodiment of the present disclosure, the first plate member may be made of other materials such as plastic.

The first manifold flow paths 214 may be variously changed in number and arrangement interval in accordance with required conditions and design specifications. The present disclosure is not restricted or limited by the number of first manifold flow paths 214 and the arrangement intervals between the first manifold flow paths 214.

Figure 4:
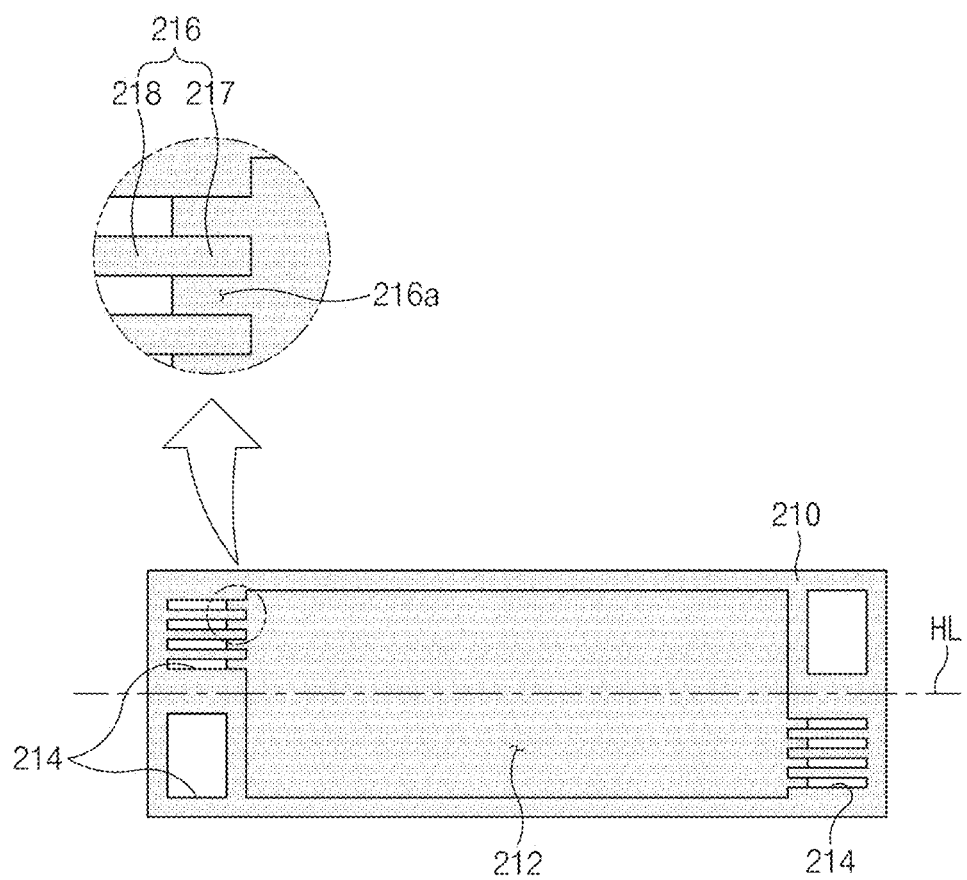
FIG. 4 is a view of a first plate member of the electrochemical device according to the embodiment of the present disclosure.

For example, referring to FIG. 4, two first manifold flow paths 214 may be provided at one end (a left end or first end) of the first plate member 210 and two first manifold flow paths 214 may be provided at the other end (a right end or second end) of the first plate member 210.

A reaction fluid (e.g., water) may be introduced into any one (e.g., an inlet manifold flow path) of the first manifold flow paths 214. The reaction fluid may be discharged from another (e.g., an outlet manifold flow path) of the first manifold flow paths 214.

Referring to FIG. 4, according to an embodiment of the present disclosure, the first manifold flow paths 214 may be respectively provided at one end and the other end of the first plate member 210 with the reaction part 212 interposed therebetween. The plurality of first manifold flow paths 214 may be symmetrically provided with respect to a horizontal reference line HL that passes through a center of the first plate member 210.

Because the plurality of first manifold flow paths 214 is symmetric with respect to the horizontal reference line HL that passes through the center of the separator 200 as described above, the positions of the first manifold flow paths 214 and the positions of the second manifold flow paths 224 may be constantly maintained even though one surface of the separator 200 (e.g., one surface of the first plate member) is inverted (rotated by 180 degrees) about the horizontal line so as to serve as the cathode separator or the anode separator.

In the embodiment of the present disclosure illustrated and described above, the example has been described in which the plurality of first manifold flow paths 214 is symmetric with respect to the horizontal reference line HL that passes through the center of the first plate member 210. However, according to another embodiment of the present disclosure, the plurality of first manifold flow paths may be symmetric with respect to a vertical reference line that passes through the center of the first plate member.

The first channel patterns 216 may extend from the edges of the first manifold flow paths 214 and define the first connection channels 216a configured to connect the reaction part 212 and the first manifold flow paths 214 so that the reaction part 212 and the first manifold flow paths 214 communicate with one another. For example, the reaction fluid introduced into the first manifold flow paths 214 may be supplied to the reaction part 212 through the first connection channels 216a.

In particular, a top surface (based on FIG. 4) of the first channel pattern 216 may be disposed on the same plane as a top surface (based on FIG. 4) of the edge of the first plate member 210.

More specifically, the plurality of first channel patterns 216 may extend from edges of the first manifold flow paths 214 (e.g., inner wall surfaces of the first manifold flow paths corresponding to the edge of the first plate member) so as to be continuously connected to the first plate member 210. The plurality of first channel patterns 216 may be spaced apart from one another in a width direction of the first plate member 210 (an upward/downward direction based on FIG. 4). The first connection channel 216a may be defined between the adjacent first channel patterns 216 and connect the reaction part 212 and the first manifold flow path 214 so that the reaction part 212 and the first manifold flow path 214 communicate with each other.

For example, the first channel pattern 216 may have a straight shape in a longitudinal direction of the first plate member 210 (a leftward/rightward direction based on FIG. 4).

For reference, the number of first channel patterns 216 and a spacing interval between the first channel patterns 216 may be variously changed in accordance with required conditions and design specifications. According to another embodiment of the present disclosure, the first channel pattern may have a curved shape or other shapes.

According to an embodiment of the present disclosure, the first channel pattern 216 may include a first protrusion pattern 217 configured to define the first connection channel 216a between the reaction part 212 and the first manifold flow path 214. The first channel pattern 216 may also include a first connection pattern 218 configured to connect the first plate member 210 and the first protrusion pattern 217 while traversing the first manifold flow path 214.

The first connection pattern 218 may extend from the inner wall surface of the first manifold flow path 214 corresponding to the edge of the first plate member 210. The first protrusion pattern 217 may be integrally connected to the end of the first connection pattern 218. The first connection pattern 218 and the first protrusion pattern 217 may collectively define the first channel pattern 216 having a continuously connected straight shape.

In particular, the first channel pattern 216 may be integrated with the first plate member 210 by partially processing a part of the first plate member 210.

For example, the first channel patterns 216 may be integrated with the first plate member 210 by partially press-processing a part of the first plate member 210.

More specifically, the first channel pattern 216 may be formed in a protrusion shape protruding from the other surface of the separator 200 by drilling a part of the first plate member 210 (forming the first manifold flow path) and then pressing one surface of the first plate member 210. At the same time when the first channel patterns 216 are formed, the first connection channel 216a recessed in a groove shape may be formed between the adjacent first channel patterns 216.

Meanwhile, in an embodiment of the present disclosure illustrated and described above, the example has been described in which the first channel pattern 216 is formed by partially press-processing a part of the first plate member 210. However, according to another embodiment of the present disclosure, the first channel pattern may be formed by etching or cutting the first plate member.

The second plate member 220 includes the through portion 222 corresponding to the reaction part 212 and the second manifold flow paths 224 corresponding to the first manifold flow paths 214. The second plate member 220 is stacked on the first plate member 210 to cover the first connection channels 216a.

The second plate member 220 may have various structures including the through portion 222 and the second manifold flow paths 224. The present disclosure is not restricted or limited by the structure of the second plate member 220.

For example, the second plate member 220 may have an approximately quadrangular plate shape. According to another embodiment of the present disclosure, the second plate member may have a circular shape or other shapes.

The through portion 222 (e.g., the through portion having an approximately quadrangular shape) corresponding to the reaction part 212 may be formed in an approximately central portion of the second plate member 220. The second manifold flow paths 224 may be formed to penetrate two opposite ends of the second plate member 220, respectively, with the through portion 222 interposed therebetween. The second manifold flow paths 224 may serve to allow hydrogen, air, and the coolant to flow (to be supplied and discharged).

For reference, according to an embodiment of the present disclosure, the second plate member 220 may be made of thin-film metal (e.g., titanium, stainless, Inconel, or aluminum). According to another embodiment of the present disclosure, the second plate member may be made of other materials such as plastic.

The second manifold flow path 224 may be variously changed in number and arrangement interval in accordance with required conditions and design specifications. The present disclosure is not restricted or limited by the number of second manifold flow paths 224 and the arrangement intervals between the second manifold flow paths 224.

Figure 5:
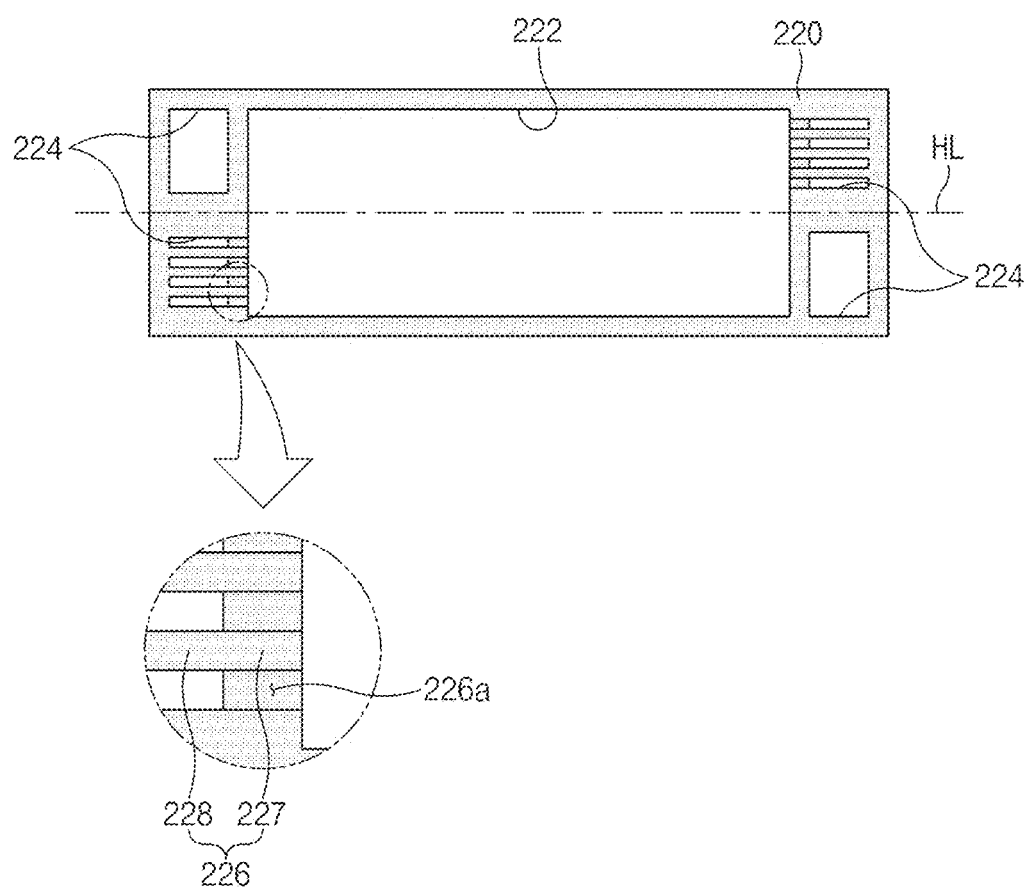
FIG. 5 is a view of a second plate member of the electrochemical device according to the embodiment of the present disclosure.
Figure 6:
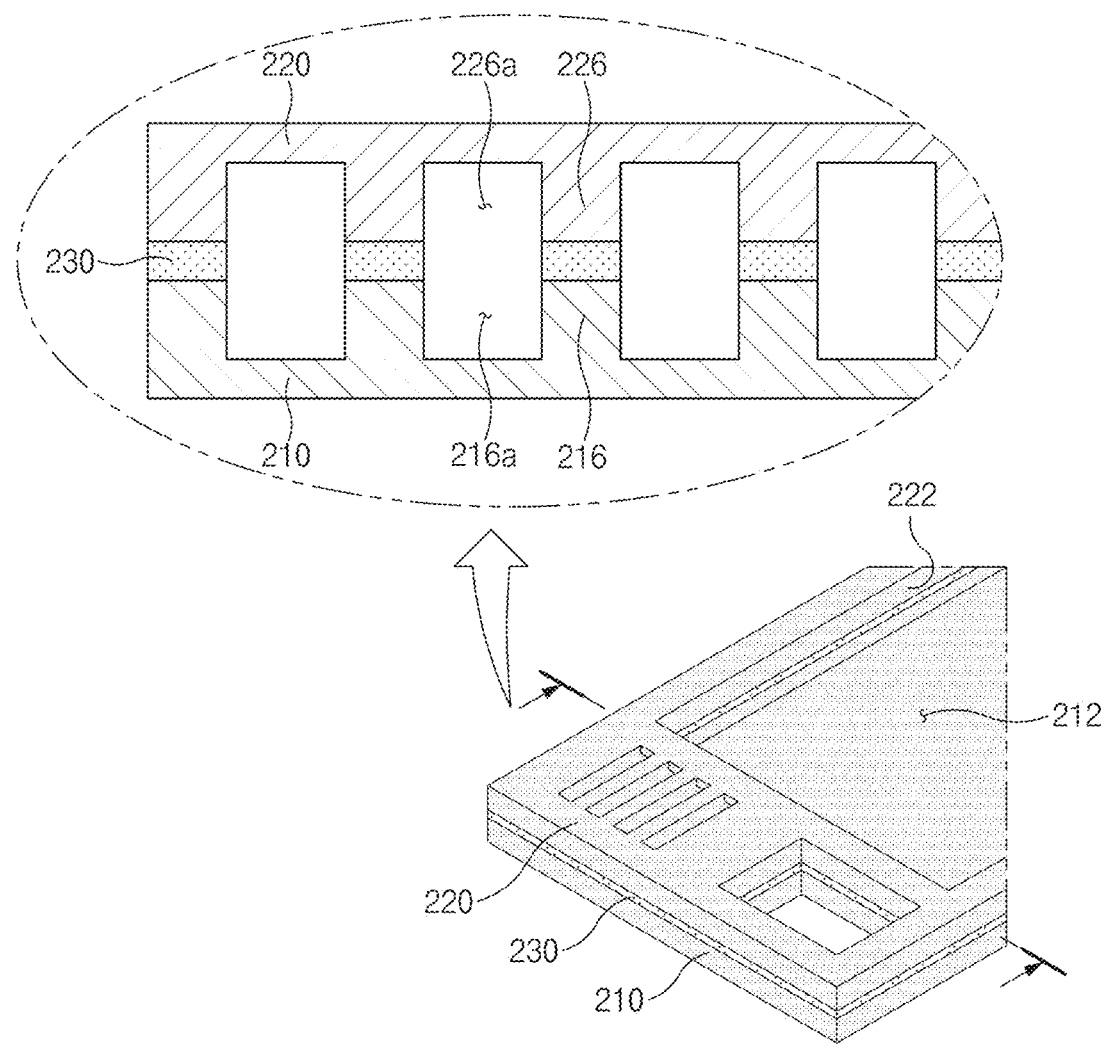
FIG. 6 is a view of a first connection flow path and a second connection flow path of the electrochemical device according to the embodiment of the present disclosure.

For example, referring to FIG. 5, two second manifold flow paths 224 may be provided at one end (a left end or first end) of the second plate member 220 and correspond to the first manifold flow paths 214, and two second manifold flow paths 224 may be provided at the other end (a right end or second end) of the second plate member 220 and correspond to the first manifold flow paths 214.

A reaction fluid (e.g., water) may be introduced into any one (e.g., an inlet manifold flow path) of the second manifold flow paths 224. The reaction fluid may be discharged from another (e.g., an outlet manifold flow path) of the second manifold flow paths 224.

Referring to FIG. 5, according to an embodiment of the present disclosure, the second manifold flow paths 224 may be respectively provided at one end and the other end of the second plate member 220 with the reaction part 212 interposed therebetween. The plurality of second manifold flow paths 224 may be symmetrically provided with respect to a horizontal reference line HL that passes through a center of the second plate member 220.

Because the plurality of second manifold flow paths 224 is symmetric with respect to the horizontal reference line HL that passes through the center of the separator 200 as described above, the positions of the first manifold flow paths 214 and the positions of the second manifold flow paths 224 may be constantly maintained even though one surface of the separator 200 (e.g., one surface of the first plate member) is inverted (rotated by 180 degrees) about the horizontal line so as to serve as the cathode separator or the anode separator.

In the embodiment of the present disclosure illustrated and described above, the example has been described in which the plurality of second manifold flow paths 224 is symmetric with respect to the horizontal reference line HL that passes through the center of the second plate member 220. However, according to another embodiment of the present disclosure, the plurality of second manifold flow paths may be symmetric with respect to a vertical reference line that passes through the center of the second plate member.

According to an embodiment of the present disclosure, the second plate member 220 may include second channel patterns 226 extending from edges of the second manifold flow paths 224. The second channel patterns 226 may be configured to define second connection channels 226a configured to connect the reaction part 212 and the second manifold flow paths 224 so that the reaction part 212 and the second manifold flow paths 224 communicate with one another. The second connection channels 226a may communicate with the first connection channels 216a.

The second channel patterns 226 may extend from the edges of the second manifold flow paths 224 and define the second connection channels 226a configured to connect the reaction part 212 and the second manifold flow paths 224 so that the reaction part 212 and the second manifold flow paths 224 communicate with one another. For example, the reaction fluid introduced into the second manifold flow paths 224 may be supplied to the reaction part 212 through the second connection channels 226a.

The second plate member 220 is stacked on the first plate member 210 so that the second channel patterns 226 overlap the first channel patterns 216.

In this case, the configuration in which the second channel patterns 226 overlap the first channel patterns 216 may mean that the second channel patterns 226 and the first channel patterns 216 are disposed to overlap one another in a plan projection view.

In particular, a top surface (based on FIG. 5) of the second channel pattern 226 may be disposed on the same plane as a top surface (based on FIG. 5) of the edge of the second plate member 220.

More specifically, the plurality of second channel patterns 226 may extend from edges of the second manifold flow paths 224 (e.g., inner wall surfaces of the second manifold flow paths corresponding to the edge of the second plate member) so as to be continuously connected to the second plate member 220. The plurality of second channel patterns 226 may be spaced apart from one another in a width direction of the second plate member 220 (an upward/downward direction based on FIG. 5). The second connection channel 226a may be defined between the adjacent second channel patterns 226 and connect the reaction part 212 and the second manifold flow path 224 so that the reaction part 212 and the second manifold flow path 224 communicate with each other.

For example, the second channel pattern 226 may have a straight shape in a longitudinal direction of the second plate member 220 (a leftward/rightward direction based on FIG. 5).

For reference, the number of second channel patterns 226 and a spacing interval between the second channel patterns 226 may be variously changed in accordance with required conditions and design specifications. According to another embodiment of the present disclosure, the second connection channel may have a curved shape or other shapes.

According to an embodiment of the present disclosure, the second channel pattern 226 may include a second protrusion pattern 227 configured to define the second connection channel 226a between the reaction part 212 and the second manifold flow path 224. The second channel pattern may also include a second connection pattern 228 configured to connect the second plate member 220 and the second protrusion pattern 227 while traversing the second manifold flow path 224.

The second connection pattern 228 may extend from the inner wall surface of the second manifold flow path 224 corresponding to the edge of the second plate member 220. The second protrusion pattern 227 may be integrally connected to the end of the second connection pattern 228. The second connection pattern 228 and the second protrusion pattern 227 may collectively define the second channel pattern 226 having a continuously connected straight shape.

In particular, the second channel pattern 226 may be integrated with the second plate member 220 by partially processing a part of the second plate member 220.

For example, the second channel patterns 226 may be integrated with the second plate member 220 by partially press-processing a part of the second plate member 220.

More specifically, the second channel pattern 226 may be formed in a protrusion shape protruding from the other surface of the separator 200 by drilling a part of the second plate member 220 (forming the second manifold flow path) and then pressing one surface of the second plate member 220. At the same time when the second channel patterns 226 are formed, the second connection channel 226a recessed in a groove shape may be formed between the adjacent second channel patterns 226.

Meanwhile, in the embodiment of the present disclosure illustrated and described above, the example has been described in which the second channel pattern 226 is formed by partially press-processing a part of the second plate member 220. However, according to another embodiment of the present disclosure, the second channel pattern may be formed by etching or cutting the second plate member.

Meanwhile, in the embodiment of the present disclosure illustrated and described above, the example has been described in which the first connection channels 216a are provided in the first plate member 210 and the second connection channels 226a, which communicate with the first connection channels 216a, are provided in the second plate member 220 stacked on the first plate member 210. However, according to another embodiment of the present disclosure, only the first connection channels 216a may be provided in the first plate member 210 without providing the second connection channel 226a in the second plate member 220.

Figure 7:
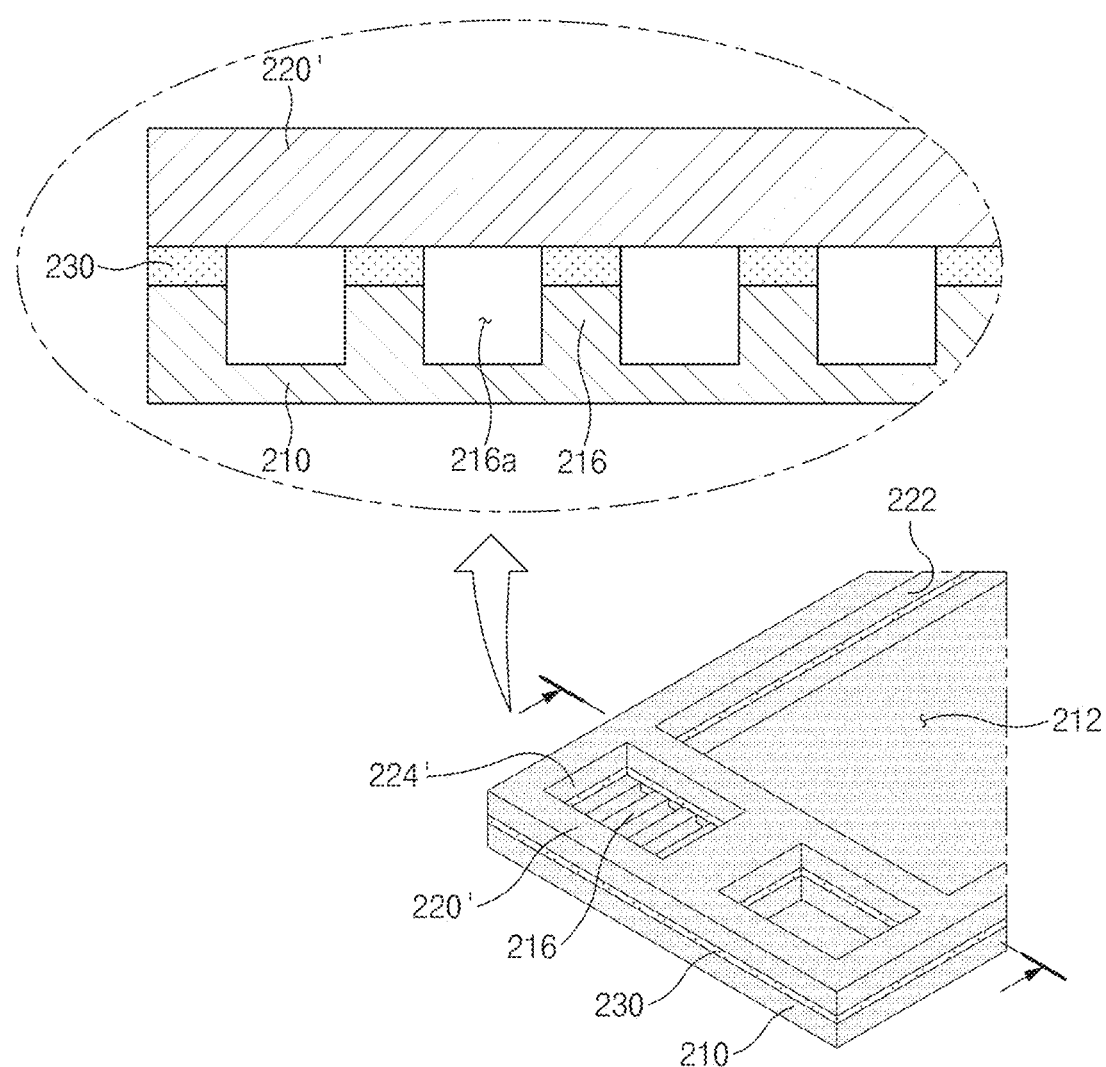
FIG. 7 is a view of a modified example of a separator of the electrochemical device according to the embodiment of the present disclosure.

In other words, referring to FIG. 7, it is possible to provide a structure in which a second manifold flow path 224' of a second plate member 220' does not have a separate channel pattern (a second channel pattern). The first connection channels 216a may be provided only in the first manifold flow paths 214 of the first plate member 210. The reaction fluid introduced into the first manifold flow path 214 and the second manifold flow path 224' may be supplied to the reaction part 212 through the first connection channels 216a defined between the first channel patterns 216.

Figure 2:
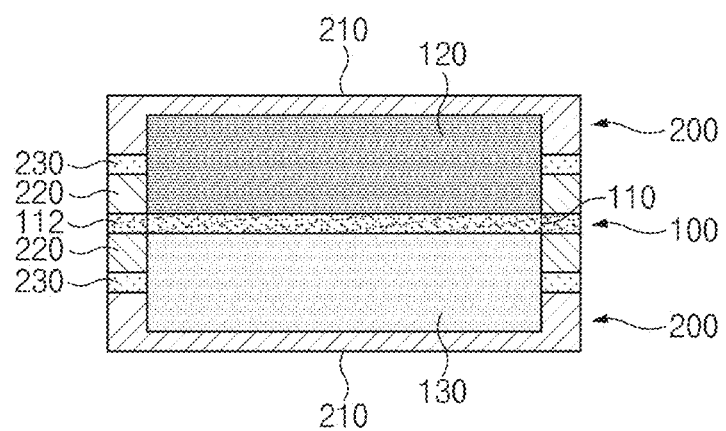
FIG. 2 is a cross-sectional view of the electrochemical device of FIG. 1 according to the embodiment of the present disclosure.
Figure 3:
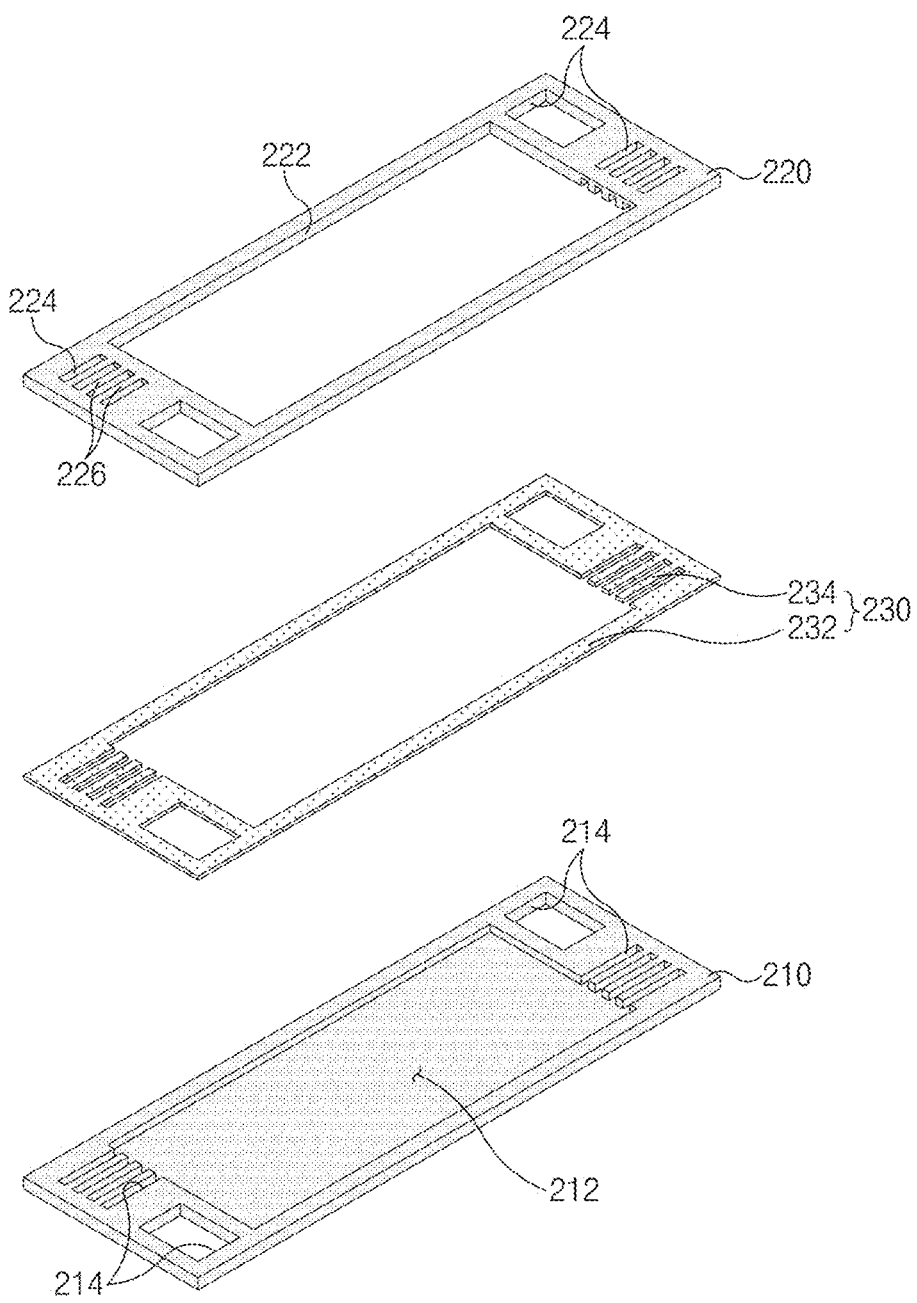
FIG. 3 is a view of part of the electrochemical device according to the embodiment of the present disclosure.

Referring to FIGS. 2 and 3, the sealing member 230 is disposed between the first plate member 210 and the second plate member 220 to seal the portion between the first plate member 210 and the second plate member 220.

In this case, the configuration in which the portion between the first plate member 210 and the second plate member 220 is sealed may mean that the portion between the first plate member 210 and the second plate member 220 is sealed. Thus, the reaction fluid introduced between the first plate member 210 and the second plate member 220 may flow in a space between the first plate member 210 and the second plate member 220 without leaking to the outside.

The sealing member 230 may have various structures capable of sealing the portion between the first plate member 210 and the second plate member 220. The present disclosure is not restricted or limited by the structure and shape of the sealing member 230.

According to an embodiment of the present disclosure, the sealing member 230 may include an edge sealing part 232 provided along the edge of the first plate member 210 and may include channel sealing parts 234 provided along the first channel patterns 216 and connected to the edge sealing part 232.

The edge sealing part 232 may have an approximately quadrangular ring shape along the edge of the top surface of the first plate member 210 that faces the second plate member 220. The channel sealing part 234 may be provided on the top surface of the first plate member 210 and have a continuous band shape (or a rod shape) along the first channel pattern 216.

The sealing member 230 may be made of an elastic material such as rubber, silicone, or urethane. The present disclosure is not restricted or limited by the material and properties of the sealing member 230.

In particular, the channel sealing parts 234 may be provided to define a unitary one-piece structure together with the edge sealing part 232.

For example, the edge sealing part 232 and the channel sealing parts 234 may be integrated by injection molding.

According to another embodiment of the present disclosure, the sealing member including the edge sealing part and the channel sealing parts may be manufactured separately from the first plate member and then attached (or coupled) to the first plate member. Alternatively, the sealing member may be provided on the first plate member by applying or transferring an elastic material or performing a printing process using the elastic material.

As described above, the separator 200 may have the structure in which the first plate member 210, the sealing member 230, and the second plate member 220 are sequentially stacked. The separators 200 may be respectively stacked on the two opposite surfaces of the reaction layer 100 with the reaction layer 100 interposed therebetween.

For example, referring to FIGS. 1 and 2, the separators 200 having the same structure may be respectively stacked on the upper and lower portions of the reaction layer 100. The separator 200 disposed on the lower portion of the reaction layer 100 may be disposed such that one surface (the top surface based on FIG. 1) thereof faces the bottom surface of the reaction layer 100. The separator 200 disposed on the upper portion of the reaction layer 100 may be disposed such that one surface (the bottom surface based on FIG. 1) thereof faces the top surface of the reaction layer 100.

The separators 200 may be respectively disposed on the two opposite surfaces of the reaction layer 100 and serve as both the cathode separator and the anode separator. For example, water may flow between the bottom surface (based on FIG. 1) of the reaction layer 100 and one surface of the separator 200 (the separator disposed at the lower side based on FIG. 1). Hydrogen may flow between the top surface of the reaction layer 100 and the separator 200 (the separator disposed at the upper side based on FIG. 1).

As described above, in an embodiment of the present disclosure, the single separator 200 may serve as both the cathode separator and the anode separator. Therefore, it is possible to obtain an advantageous effect of simplifying a structure and a manufacturing process and reducing manufacturing costs.

In other words, in the related art, it is necessary to individually manufacture the separator (the anode separator) for defining a channel through which water flows and the separator (the cathode separator) for defining a channel through which hydrogen flows. As a result, there is a problem in that the structure and the manufacturing process are complicated and the productivity and the production efficiency deteriorate.

In contrast, according to the embodiment of the present disclosure, the single type of separator 200 may serve as the cathode separator and the anode separator. Therefore, in comparison with the case in the related art in which two types of separators are used, the use of the single type of separator makes it possible to simplify the structure and the manufacturing process.

Meanwhile, in an embodiment of the present disclosure illustrated and described above, the example has been described in which the reaction surface 212a of the reaction part 212 is formed to be flat and the mass transfer layer (e.g., the porous transport layer) is in direct contact with the reaction surface of the reaction part. However, according to another embodiment of the present disclosure, a reaction pattern may be additionally provided on the reaction surface of the reaction part.

Figure 8:
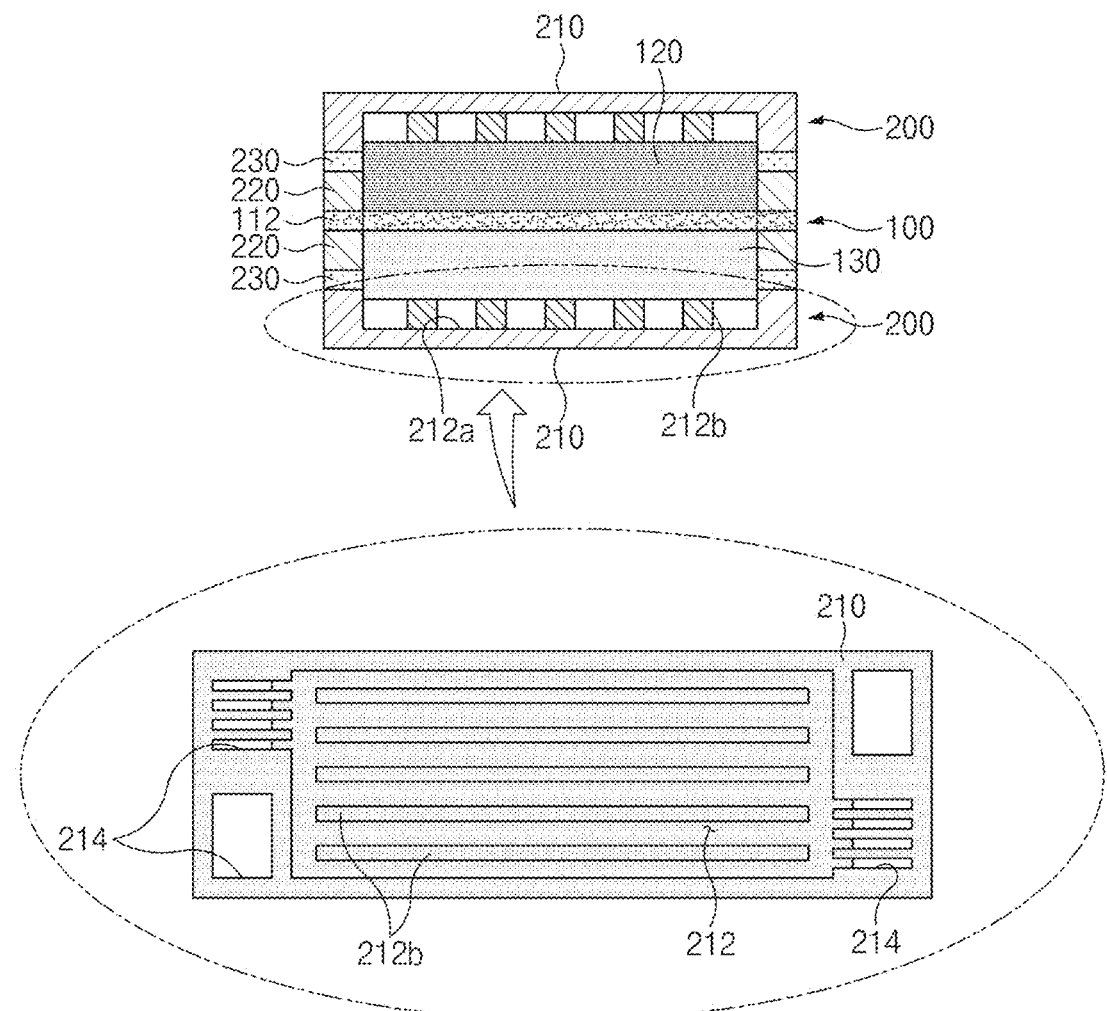
FIG. 8 is a view of a reaction channel of the electrochemical device according to the embodiment of the present disclosure.

In other words, referring to FIG. 8, according to another embodiment of the present disclosure, channels of reaction patterns 212b may be provided on the reaction surface 212a of the reaction part 212 of the first plate member 210. The porous transport layer 130 may be in close contact with the reaction pattern 212b.

The reaction pattern 212b may have various structures capable of defining a reaction channel (not illustrated) along which the reaction fluid may flow. The present disclosure is not restricted or limited by the structure and shape of the reaction pattern 212b.

For example, the reaction pattern 212b may have a straight shape in the longitudinal direction of the first plate member 210, and the reaction channel having a straight shape may be defined between the adjacent reaction patterns 212b. According to another embodiment of the present disclosure, the reaction pattern may have a curved shape or other shapes.

As described above, in an embodiment of the present disclosure, the reaction patterns 212b may be provided on the reaction surface 212a of the reaction part 212, such that the location of the reaction channels along which the reaction fluid may flow may be ensured on the reaction surface 212a. Therefore, it is possible to reduce a differential pressure of the reaction part 212 and more uniformly distribute the reaction fluid over the entire region of the reaction part 212.

Figure 9:
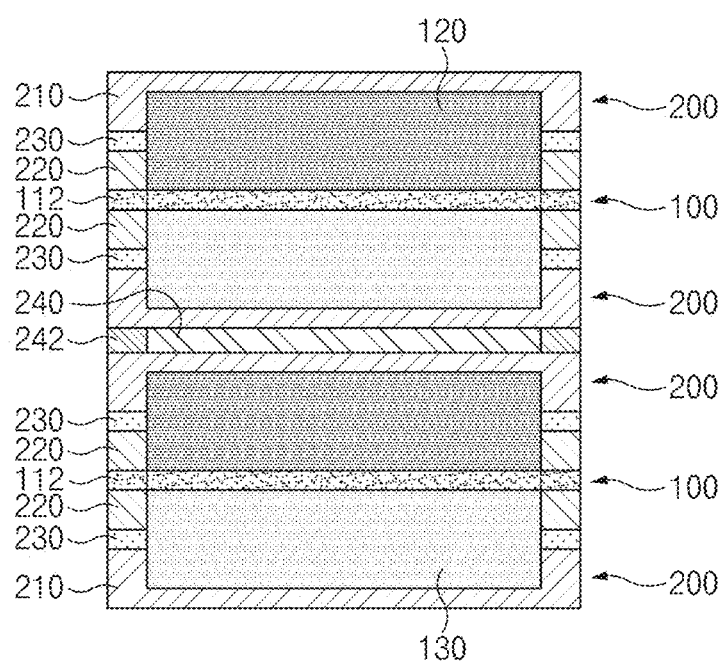
FIG. 9 is a view of a unit cell gasket member and a conductive member of the electrochemical device according to the embodiment of the present disclosure.

Referring to FIG. 9, according to an embodiment of the present disclosure, the electrochemical device 10 may include a gasket member 112 provided on one surface (e.g., a first surface) of the separator 200 facing the membrane electrode assembly 110. The gasket member 112 may be configured to seal a portion between the membrane electrode assembly 110 and the separator 200. The electromechanical device 10 may also include a unit cell gasket member 242 disposed on the other surface (e.g., a second surface) of the separator 200 and a conductive member 240 disposed on the other surface of the separator 200.

The gasket member 112 is provided to seal the portion between the membrane electrode assembly 110 and the separator 200 (e.g., the second plate member).

Because the gasket member 112 is provided between the membrane electrode assembly 110 and the separator 200 as described above, it is possible to prevent the reaction fluid (e.g., water) introduced into the reaction part 212 from leaking through a space between the membrane electrode assembly 110 and the separator 200.

The gasket member 112 may have various structures capable of sealing the portion between the membrane electrode assembly 110 and the separator 200. The present disclosure is not restricted or limited by the structure of the gasket member 112.

For example, the gasket member 112 may be provided to surround the entire periphery of the membrane electrode assembly 110 (see FIG. 1).

The gasket member 112 may be made of an elastic material such as rubber, silicone, or urethane. The present disclosure is not restricted or limited by the material and properties of the gasket member 112.

For example, the gasket member 112 may be integrated with the membrane electrode assembly 110 by injection molding. Alternatively, the gasket member 112 may be provided by other methods such as application, transfer, or printing.

The unit cell gasket member 242 is provided to seal a portion between the unit cells disposed adjacent to each other (between the separators disposed adjacent to each other to constitute different unit cells).

Because the unit cell gasket member 242 is provided between the separators 200 disposed adjacent to each other to constitute the different unit cells as described above, it is possible to prevent the reaction fluid (e.g., water) introduced into the unit cells from flowing into a space between the separators 200.

The unit cell gasket member 242 may have various structures capable of sealing the portion between the separators 200 disposed between the adjacent reaction layers 100. The present disclosure is not restricted or limited by the structure of the unit cell gasket member 242.

For example, the unit cell gasket member 242 may have an approximately quadrangular ring shape along the edge of the separator 200.

The unit cell gasket member 242 may be made of an elastic material such as typical rubber, silicone, or urethane. The present disclosure is not restricted or limited by the material and properties of the unit cell gasket member 242.

For example, the unit cell gasket member 242 may be integrated with the separator 200 by injection molding. Alternatively, the unit cell gasket member 242 may be provided by other methods such as application, transfer, or printing.

The conductive member 240 is provided to electrically connect the separators 200 disposed between the adjacent reaction layers 100 (the separators constituting the different unit cells).

The conductive member 240 may have various structures capable of electrically connecting the adjacent separators 200. The present disclosure is not restricted or limited by the structure and shape of the conductive member 240.

For example, the conductive member 240 may have an approximately quadrangular plate shape and be in close contact with the adjacent separators 200 (e.g., the adjacent first plate members).

A current collector made of a metallic material having electrical conductivity may be used as the conductive member 240. The present disclosure is not restricted or limited by the material and properties of the conductive member 240.

In particular, the unit cell gasket member 242 may be provided to surround the conductive member 240. The conductive member 240 may have a thickness corresponding to a compression thickness of the unit cell gasket member 242 (a thickness of the unit cell gasket member 242 compressed between the adjacent separators 200).

Because the conductive member 240 has the thickness corresponding to the compression thickness of the unit cell gasket member 242 as described above, it is possible to obtain an advantageous effect of stably maintaining the sealing performance between the separators 200 while ensuring electrical connection (electrical conductivity) implemented between the separators 200 by the conductive member 240.

As described above, according to an embodiment of the present disclosure, it is possible to obtain an advantageous effect of improving the safety and reliability, and simplifying the structure of an electrochemical device and the manufacturing process of the sealing member.

In particular, according to embodiments of the present disclosure, it is possible to obtain an advantageous effect of simplifying the structure and the manufacturing process while ensuring a stable flow (flow efficiency) of the target fluid in the connection channel that guides the target fluid, which is introduced through the manifold flow path of the separator, to the reaction part.

Among other things, according to embodiments of the present disclosure, it is possible to obtain an advantageous effect of simplifying the process of manufacturing the sealing member while preventing the connection channel from being clogged.

In addition, according to embodiments of the present disclosure, it is possible to implement both the cathode separator and the anode separator by using the single type of separator having the same structure.

In addition, according to embodiments of the present disclosure, it is possible to obtain an advantageous effect of improving the productivity and production efficiency and reducing the manufacturing costs.

While the embodiments have been described above, the embodiments are just illustrative and not intended to limit the present disclosure. It should be appreciated by those of ordinary skill in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A water electrolysis separator comprising:
a first plate member including a reaction part configured to define a reaction region in which a reaction is produced by a membrane electrode assembly (MEA), first manifold flow paths spaced apart from the reaction part, and first channel patterns extending from edges of the first manifold flow paths and configured to define first connection channels configured to connect the reaction part and the first manifold flow paths so that the reaction part and the first manifold flow paths communicate with one another;
a second plate member stacked on the first plate member, configured to cover the first connection channels, and including a through portion corresponding to the reaction part and second manifold flow paths corresponding to the first manifold flow paths; and
a sealing member configured to seal a portion between the first plate member and the second plate member,
wherein the second plate member comprises second channel patterns extending from edges of the second manifold flow paths and configured to define second connection channels configured to connect the reaction part and the second manifold flow paths so that the reaction part and the second manifold flow paths communicate with one another, and
wherein the second connection channels communicate with the first connection channels.

2. The water electrolysis separator of claim 1, wherein the first channel pattern comprises:
a first protrusion pattern configured to define the first connection channel between the reaction part and the first manifold flow path; and
a first connection pattern configured to connect the first plate member and the first protrusion pattern while traversing the first manifold flow path.

3. The water electrolysis separator of claim 1, wherein the first channel pattern is integrated with the first plate member by partially processing a part of the first plate member.

4. The water electrolysis separator of claim 1, wherein the sealing member comprises:
an edge sealing part provided along an edge of the first plate member; and
channel sealing parts provided along the first channel patterns and connected to the edge sealing part.

5. The water electrolysis separator of claim 4, wherein the channel sealing parts are provided to define a unitary one-piece structure together with the edge sealing part.

6. The water electrolysis separator of claim 1, wherein the first manifold flow paths are respectively provided at one end and the other end of the first plate member with the reaction part interposed therebetween, and wherein the first manifold flow paths are symmetric with respect to a horizontal reference line that passes through a center of the first plate member.

7. The water electrolysis separator of claim 1, wherein a reaction surface of the reaction part is formed to be flat.

8. The water electrolysis separator of claim 1, comprising:
a reaction pattern provided on a reaction surface of the reaction part.

9. The water electrolysis separator of claim 1, wherein the second channel pattern comprises:
a second protrusion pattern configured to define the second connection channel between the reaction part and the second manifold flow path; and
a second connection pattern configured to connect the second plate member and the second protrusion pattern while traversing the second manifold flow path.

10. The water electrolysis separator of claim 1, wherein the second channel pattern is integrated with the second plate member by partially processing a part of the second plate member.

11. An electrochemical device comprising:
a membrane electrode assembly (MEA);
mass transfer layers respectively stacked on two opposite surfaces of the membrane electrode assembly; and
separators respectively stacked on the mass transfer layers,
wherein each separator includes
a first plate member including a reaction part configured to define a reaction region in which a reaction is produced by the membrane electrode assembly (MEA), first manifold flow paths spaced apart from the reaction part, and first channel patterns extending from edges of the first manifold flow paths and configured to define first connection channels configured to connect the reaction part and the first manifold flow paths so that the reaction part and the first manifold flow paths communicate with one another,
a second plate member stacked on the first plate member, configured to cover the first connection channels and including a through portion corresponding to the reaction part, and second manifold flow paths corresponding to the first manifold flow paths, and
a sealing member configured to seal a portion between the first plate member and the second plate member,
wherein the second plate member comprises second channel patterns extending from edges of the second manifold flow paths and configured to define second connection channels configured to connect the reaction part and the second manifold flow paths so that the reaction part and the second manifold flow paths communicate with one another, and
wherein the second connection channels communicate with the first connection channels.

12. The electrochemical device of claim 11, wherein the first channel pattern comprises:
- a first protrusion pattern configured to define the first connection channel between the reaction part and the first manifold flow path; and
- a first connection pattern configured to connect the first plate member and the first protrusion pattern while traversing the first manifold flow path.

13. The electrochemical device of claim 11, wherein the sealing member comprises:
- an edge sealing part provided along an edge of the first plate member; and
- channel sealing parts provided along the first channel patterns and connected to the edge sealing part.

14. The electrochemical device of claim 13, wherein the channel sealing parts are provided to define a unitary one-piece structure together with the edge sealing part.

15. The electrochemical device of claim 11, wherein a reaction surface of the reaction part is formed to be flat and wherein the mass transfer layer passes through the through portion and is in close contact with the reaction surface.

16. The electrochemical device of claim 11, comprising:
- a reaction channel provided on a reaction surface of the reaction part,
- wherein the mass transfer layer passes through the through portion and is in close contact with the reaction channel.

17. The electrochemical device of claim 11, wherein the second channel pattern comprises:
- a second protrusion pattern configured to define the second connection channel between the reaction part and the second manifold flow path; and
- a second connection pattern configured to connect the second plate member and the second protrusion pattern while traversing the second manifold flow path.

18. The electrochemical device of claim 11, comprising:
- a gasket member provided on one surface of the separator facing the membrane electrode assembly, the gasket member configured to seal a portion between the membrane electrode assembly and the separator;
- a unit cell gasket member provided on the other surface of the separator; and
- a conductive member provided on the other surface of the separator.

* * * * *